United States Patent
Kamath

(10) Patent No.: US 11,482,937 B2
(45) Date of Patent: Oct. 25, 2022

(54) SELF-POWERED HIGH VOLTAGE ISOLATED DIGITAL INPUT RECEIVER WITH LOW VOLTAGE TECHNOLOGY

(71) Applicant: TEXAS INSTRUMENTS INCORPORATED, Dallas, TX (US)

(72) Inventor: Anant Shankar Kamath, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/804,352

(22) Filed: Feb. 28, 2020

(65) Prior Publication Data

US 2020/0280262 A1 Sep. 3, 2020

(30) Foreign Application Priority Data

Mar. 1, 2019 (IN) .............................. 201941008089

(51) Int. Cl.
| | |
|---|---|
| *H02M 3/335* | (2006.01) |
| *H02M 7/162* | (2006.01) |
| *H02M 7/06* | (2006.01) |
| H02M 1/00 | (2006.01) |

(52) U.S. Cl.
CPC ......... *H02M 3/33576* (2013.01); *H02M 7/06* (2013.01); *H02M 7/162* (2013.01); *H02M 1/0006* (2021.05)

(58) Field of Classification Search
CPC ...... H02M 7/162; H02M 7/06; H02M 1/0006; H03K 17/7955; H02H 9/025
See application file for complete search history.

(56) References Cited

U.S. PATENT DOCUMENTS

| | | | | |
|---|---|---|---|---|
| 3,691,403 | A | * | 9/1972 | Newmeyer ............ H03K 19/14 327/97 |
| 4,197,471 | A | * | 4/1980 | Lackey .............. H03K 17/7955 326/21 |
| 4,318,094 | A | * | 3/1982 | Ferrigno, Jr. ........ H01H 47/226 340/657 |
| 4,520,281 | A | * | 5/1985 | Green .................. H03K 17/567 327/172 |
| 4,691,263 | A | * | 9/1987 | Kenny ................ H03K 17/785 361/101 |

(Continued)

*Primary Examiner* — Yusef A Ahmed
(74) *Attorney, Agent, or Firm* — Mark A. Valetti; Charles A. Brill; Frank D. Cimino

(57) ABSTRACT

An isolation circuit for electrically isolating a first circuit operating at a first voltage from a second circuit operating at a second voltage that is different than the first voltage is provided. The isolation circuit includes: a first voltage source that operates at the first voltage, the first voltage source having a first supply rail and a second supply rail; an isolation device having a first input, a second input, a first output and a second output, the second input coupled to a first ground potential and the second output coupled to a second ground potential that is electrically isolated from the first ground potential by the isolation device; a first resistor coupled between the first supply rail and the first input of the isolation device; a second resistor coupled to the first input of the isolation device and the second input of the isolation device; and wherein the first output of the isolation device is coupled to the second circuit.

20 Claims, 3 Drawing Sheets

(56) References Cited

U.S. PATENT DOCUMENTS

| | | | | |
|---|---|---|---|---|
| 5,398,025 A * | 3/1995 | Herman | ............... | G01R 19/155 323/282 |
| 5,789,960 A * | 8/1998 | Bower | ................ | G05B 19/054 327/319 |
| 6,489,748 B1 * | 12/2002 | Okamura | ............... | H04Q 1/032 320/116 |
| 8,477,517 B2 * | 7/2013 | Joshi | ................ | H02M 3/33515 363/51 |
| 8,912,935 B1 * | 12/2014 | Smith | ............... | H03K 19/1776 341/137 |
| 9,057,743 B2 * | 6/2015 | Alley | .................... | G01R 19/00 |
| 10,712,426 B2 * | 7/2020 | Herring | ................... | H04B 1/18 |
| 2004/0032754 A1 * | 2/2004 | Yang | ...................... | H02M 1/32 363/56.09 |
| 2010/0265740 A1 * | 10/2010 | Zargari | ................ | H02M 1/096 363/17 |
| 2012/0075895 A1 * | 3/2012 | Kletti | ....................... | G05F 3/18 363/126 |
| 2013/0127358 A1 * | 5/2013 | Yao | .................. | H02M 3/33571 315/201 |
| 2014/0312909 A1 * | 10/2014 | Alley | ................ | G01R 31/3275 324/415 |
| 2014/0312923 A1 * | 10/2014 | Alley | ................ | G01R 19/0092 324/713 |
| 2017/0026043 A1 * | 1/2017 | Lazaravich | .......... | G05B 19/054 |
| 2018/0328973 A1 * | 11/2018 | Kamath | ............. | G01R 31/2829 |
| 2020/0089183 A1 * | 3/2020 | Kallikuppa | ........ | G05B 19/0425 |
| 2020/0182965 A1 * | 6/2020 | Herring | ............. | H03K 19/17784 |

\* cited by examiner

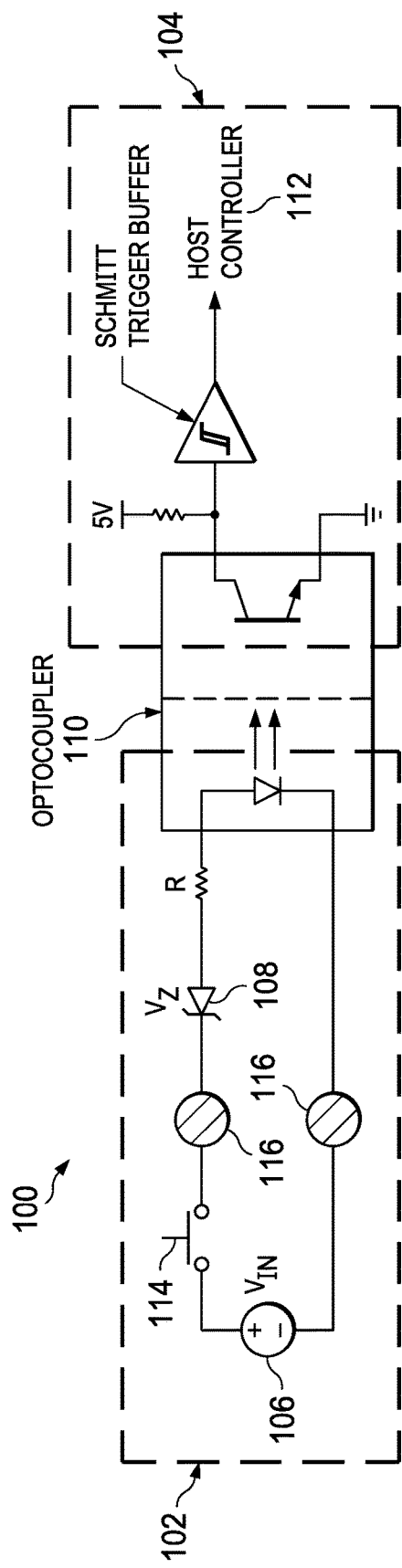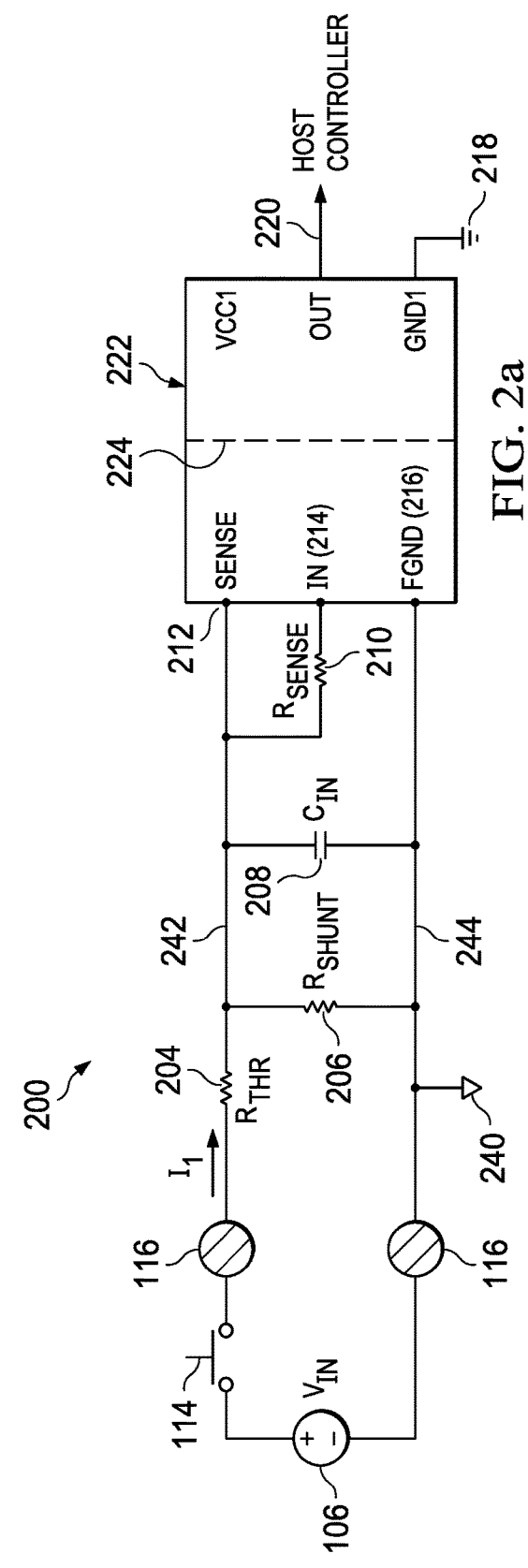
FIG. 1 (PRIOR ART)
FIG. 2a

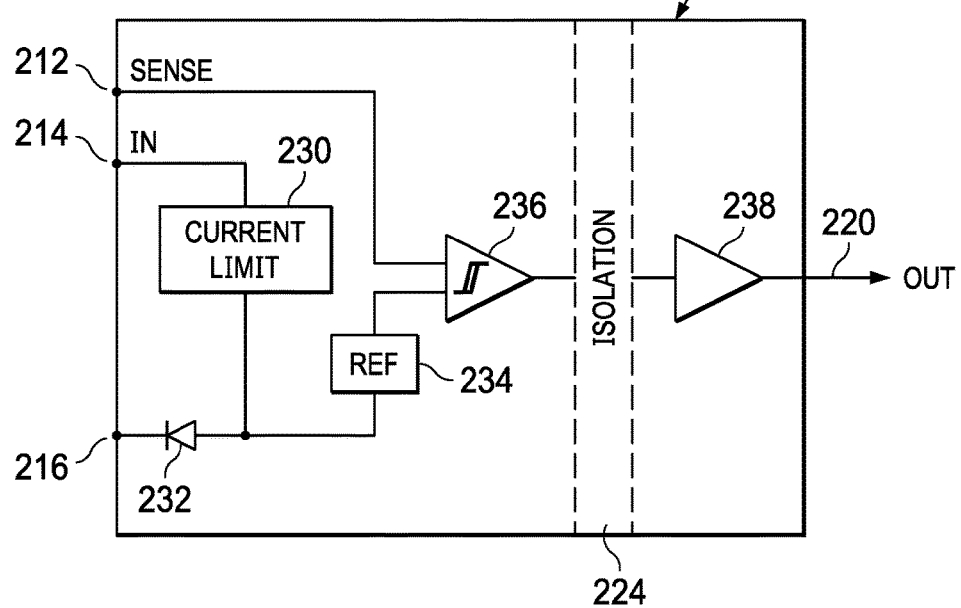
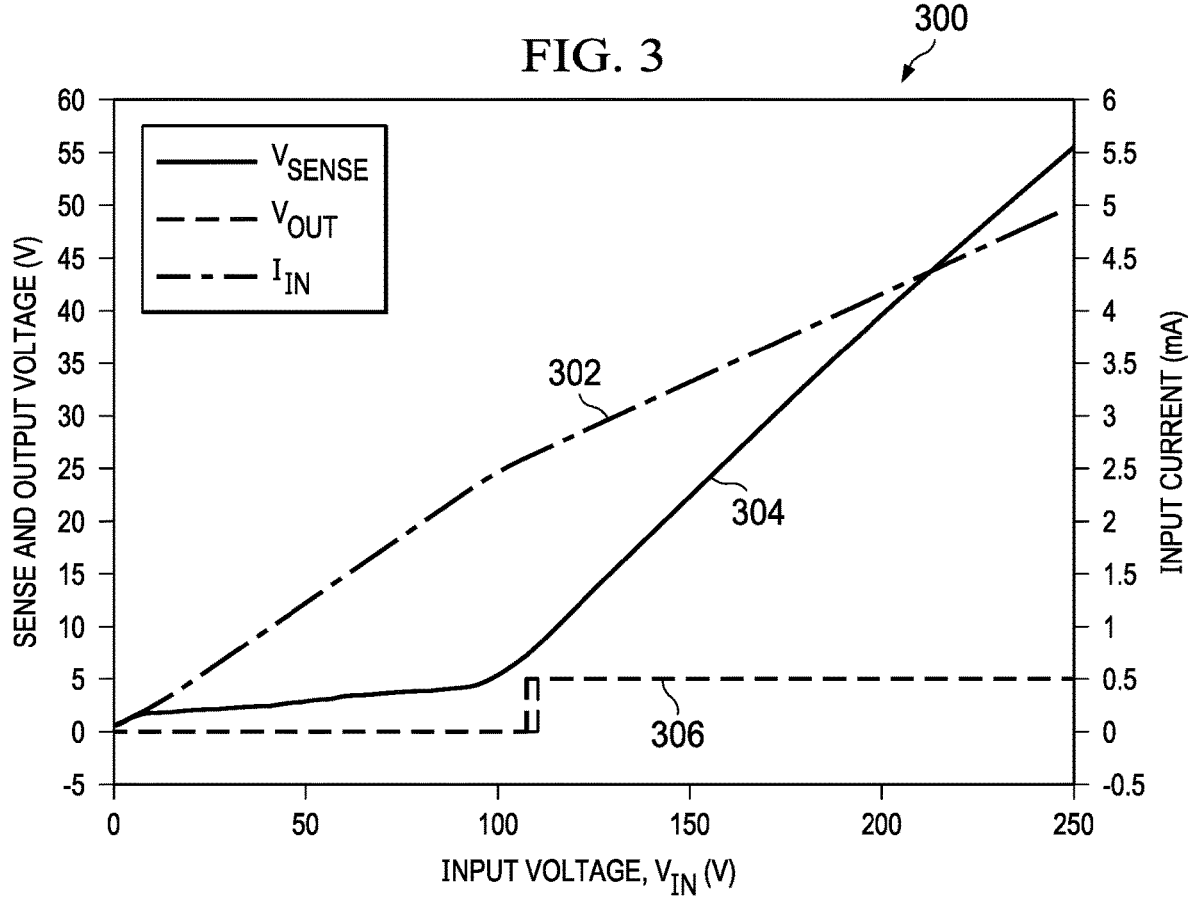

SELF-POWERED HIGH VOLTAGE ISOLATED DIGITAL INPUT RECEIVER WITH LOW VOLTAGE TECHNOLOGY

CROSS-REFERENCE TO RELATED APPLICATIONS

The application claims priority to Indian Provisional Patent Application No. 201941008089, which was filed Mar. 1, 2019, is titled "Self-Powered High Voltage Isolated Digital Input Receiver with Low Voltage Technology," and is hereby incorporated herein by reference in its entirety.

BACKGROUND

Certain applications in electronics, such as industrial and automotive applications, require using a high-voltage, such as 60-300 Volts (AC or DC). However, electronic components capable of withstanding these voltages can be large, expensive and not easily integrated into a semiconductor chip. Hence, a need exists to handle higher-voltage in certain applications while also using standard components (usually operating at much lower voltages, such as 5V or less) where a large number of components and a high degree of integration is necessary (such as in microprocessors, logic circuits and other devices used to process signals). In order to accomplish this, extra circuitry may be necessary to isolate the high-voltage signals from the lower-voltage circuitry used to process the input signals.

FIG. 1 illustrates a traditional approach to isolate a high-voltage input from a host controller that operates at a lower voltage. Section 102 represents the high-voltage side of isolation device 100 and section 104 illustrates lower voltage circuitry. Isolation device 110 (shown as an optocoupler) along with Zener diode 108 are provided to isolate and protect low-voltage section 104 from high-voltage section 102. Examples of high-voltage section 102 include industrial equipment and automotive electronics that operate at higher voltages than standard semiconductor processors and other logic circuitry (illustrated as host controller 112). Voltage supply 106 may be an AC or DC supply that provides a great enough voltage (such as 48V-300V) to operate the high-voltage components of section 102. Switch 114 may be provided to disconnect isolation device 100 from voltage supply 106. Screw terminals 116 provide a connection between the isolation device and voltage supply 106.

The traditional approach of FIG. 1 is a discrete solution that cannot be integrated into standard, lower-voltage devices because of the high-voltage requirements for the Zener diode 108. In addition, traditional isolation devices 110 do not provide precise current limiting on the high-voltage portion.

SUMMARY

In accordance with an example embodiment, an isolation circuit for electrically isolating a first circuit operating at a first voltage from a second circuit operating at a second voltage that is different than the first voltage is provided. The isolation circuit comprises: a first voltage source that operates at the first voltage, the first voltage source having a first supply rail and a second supply rail; an isolation device having a first input, a second input, a first output and a second output, the second input coupled to a first ground potential and the second output coupled to a second ground potential that is electrically isolated from the first ground potential by the isolation device; a first resistor coupled between the first supply rail and the first input of the isolation device; a second resistor coupled to the first input of the isolation device and the second input of the isolation device; and wherein the first output of the isolation device is coupled to the second circuit. Preferably, the first voltage is an AC voltage, and the isolation circuit further comprises a bridge rectifier. The bridge rectifier may include: a first diode having an anode and a cathode and connected between the first resistor and the first input of the isolation device, the anode coupled to the first resistor and the cathode coupled to the first input of the isolation device; a second diode having an anode and a cathode, the cathode coupled to the cathode of the first diode and the first input of the isolation device and the anode is coupled to the second supply rail; a third diode having an anode and a cathode, the cathode coupled to the anode of the second diode and the second supply rail and the anode coupled to the second input of the isolation device; and a fourth diode having an anode and a cathode, the anode coupled to the anode of the third diode and the second input of the isolation device and the cathode coupled to the first resistor and the anode of the first diode.

Alternatively, the first voltage is a DC voltage, and the second supply rail is connected to the first ground potential. Preferably, the first voltage is between 48 Volts and 300 Volts, and the second voltage is less than 48 Volts (more preferably, the second voltage is less than or equal to 5 Volts and even more preferably, the second voltage is around 1 Volt to 2 Volts). The isolation circuit may include a capacitor coupled between the first input to the isolation device and the second input to the isolation device. Alternatively, the isolation device has a third input, and a third resistor is connected between the first input and the third input of the isolation device.

In accordance with an example embodiment, an industrial system is disclosed having a motor driven by high-voltage circuitry connected to a high-voltage supply and low-voltage circuitry that is connected to a low-voltage supply and electrically isolated from the high-voltage supply. The industrial system includes: an isolation device coupled between the high-voltage circuitry and the low-voltage circuitry, the isolation device having a first input, a first ground connection, an output coupled to the low-voltage circuitry and a second ground connection coupled to the low-voltage circuitry and electrically isolated from the first ground connection; and the high-voltage circuitry coupled to a supply rail of the high-voltage supply. The high-voltage circuitry comprises: a first resistor having a first terminal coupled to the supply rail and a second terminal; and a second resistor having a first terminal coupled to the first input of the isolation device and a second terminal coupled to the first ground connection of the isolation device.

In an example embodiment, the high-voltage supply is an AC voltage supply, and the industrial system further comprises a bridge rectifier. The bridge rectifier includes: a first diode having an anode and a cathode and connected between the first resistor and the first input of the isolation device, the anode coupled to the second terminal of the first resistor and the cathode coupled to the first input of the isolation device; a second diode having an anode and a cathode, the cathode coupled to the cathode of the first diode and the first input of the isolation device and the anode is coupled to a ground rail of the high-voltage supply; a third diode having an anode and a cathode, the cathode coupled to the anode of the second diode and the ground rail and the anode is coupled to first ground connection of the isolation device; and a fourth diode having an anode and a cathode, the anode coupled to the anode of the third diode and the first ground connection of the isolation device and the cathode coupled to the second terminal of the first resistor and the anode of the first diode.

In another example embodiment, the high-voltage supply is a DC voltage supply, and the first ground connection of the isolation device is connected to a ground rail of the high-voltage supply.

Preferably, the high-voltage supply is between 48 Volts and 300 Volts, and the low-voltage supply is less than or equal to 5 Volts (even more preferably, the low-voltage supply is around 1 Volt to 2 Volts).

BRIEF DESCRIPTION OF THE DRAWINGS

For a detailed description of various examples, reference will now be made to the accompanying drawings in which:

FIG. 1 shows a schematic diagram of a traditional high-voltage digital isolation device;

FIG. 2a shows a schematic diagram of an isolated digital input receiver in accordance with an example;

FIG. 2b shows a schematic diagram of an example of an isolated device used in the example of FIG. 2a;

FIG. 3 is a voltage/current diagram for an example isolation system of FIG. 2a and FIG. 2b.

Features with the same reference numerals are intended to be the same or similar features.

DETAILED DESCRIPTION

Figure 4:
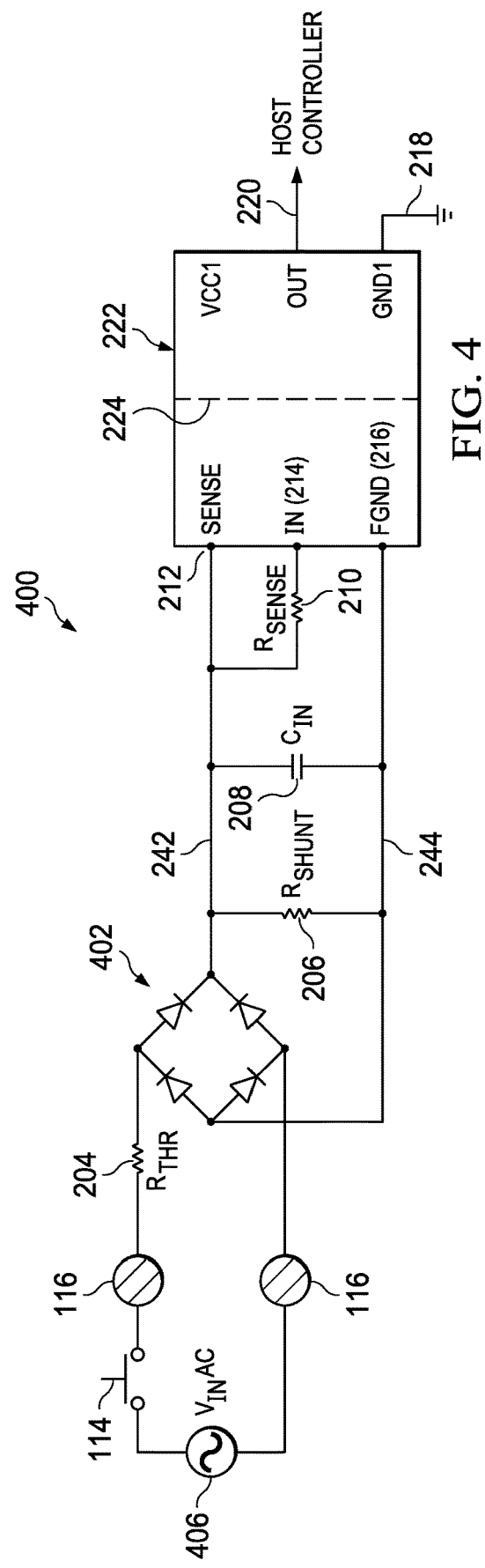
FIG. 4 shows a schematic diagram of an isolation system in accordance with another example.

FIG. 2a illustrates an example isolation system 200. Isolation system 200 does not utilize an optocoupler or a Zener diode to provide isolation. Instead, isolation system 200 utilizes isolation device 222 along with one or more passive components that will be discussed in more detail below. The portion of isolation system 200 that is to the left of isolation device 222 is the high-voltage portion (with voltages for $V_{IN}$ that may range around 48V to 300V or more) and the portion to the right of isolation device 222 is the lower-voltage portion (with voltages that are preferably less than 48V and more preferably less than 10V—even more preferably in the 1V to 5V range). However, the input to isolation device 222 may be as high as 60V or higher. Voltage source 106 is the high-voltage supply for the high-voltage components used in industrial systems, motor drives, automotive systems, LED lighting sources, home automation systems, systems for detecting high-voltages, voltage monitoring systems used in industrial or automotive applications and other systems that rely on voltage in excess of 48V, for example.

As will be discussed in more detail below, isolation device 222 preferably isolates voltage source 106, $V_{IN}$, and ground connection 240, also referred to as "field ground", on the high-voltage portion (also referred to as the "field side") from output 220 and ground 218 on the lower-voltage portion. In addition, isolation device 222 preferably provides a current limit between an input of isolation device 222 to high-voltage portion ground 240. Preferably, if the current into isolation device 222 is relatively constant, the voltage drop across resistor 204, $R_{THR}$, will remain relatively constant. As the voltage of voltage source 106 increases, the current, $I_1$, through resistor 204 can be increased by including resistor 206, $R_{SHUNT}$, in parallel to voltage source 106. If $I_1$ increases, the voltage drop across resistor 204 will increase. By selecting the proper values for resistor 204 and resistor 206 based on the magnitude of voltage source 106 and the maximum input voltage, $V_{MAX}$, that isolation device 222 can tolerate (discussed in further detail below), the voltage supplied to isolation device 222 will, preferably, be less than $V_{MAX}$ of isolation device 222. As will be discussed in more detail below, in another example, the value of resistor 206 should be set so that the current flowing through resistor 206 is less than the input current of isolation device 222.

Capacitor 208, $C_{IN}$, is included between rails 242 and 244 in another example. The value of capacitor 208 is preferably determined such that any voltage overshoot at node 212 is minimized. Resistor 210, $R_{SENSE}$, is included between rail 242 and input 214 in another example. Resistor 210 may be used to control the current flowing into isolation device 222. In another example, the voltage at input 212 is around 8.25V and the transition voltage threshold between terminals 116 is 8.25V plus the voltage drop across resistor 204. In another example, a resistor and diode connected in series may be added in parallel to resistor 206 and capacitor 208. Preferably, the cathode of the diode is connected to rail 242 and the resistor is connected between the anode of the diode and rail 244.

As discussed above, isolation device 222 preferably isolates (depicted as isolation 224) output 220 and ground 218 from voltage source 106 and field ground 240. In addition, isolation device 222 preferably limits the current flowing into isolation device 222.

Examples of an isolation device 222 are devices ISO1211 and ISO1212 fabricated by Texas Instruments Incorporated. These devices are depicted in FIG. 2b. In this example, current limiter 230 is placed between input 214 and the anode of diode 232. The current limiter works by maintaining a constant voltage between input 212 and input 214 using negative feedback. The current through the input 212 is negligible, so the input current drawn by device 222 is mostly through input 214. By maintaining a constant voltage between input 212 and input 214, which is the voltage across resistor 210, the current through resistor 210, which is almost the same as current through device 222 is regulated or limited. The cathode of diode 232 is connected to field ground 240 via output 216. Diode 232 is used to block and block against unintentional negative voltages applied to device 222. Hysteresis comparator 236 is connected to input 212 at one input and to reference 234 at the other input. Reference 234 sets the threshold voltage for device 222. If the voltage at input 212 is higher than the reference voltage, the output of hysteresis comparator 236 will be high. The output of hysteresis comparator 236 is signaled across the isolation barrier 224 (which can be implemented by capacitive, magnetic, optical or any other isolation means) and received by receiver 238 through isolation region 224. The signaling across the barrier can be achieved in multiple ways, for example using Amplitude Shift Keying (ASK) modulation. The isolation receiver 238 receives the output of hysteresis comparator 236 by, for example, an envelope detector for ASK signals.

Referring to the examples of FIGS. 2a and 2b, the following equations can be used to determine the threshold voltage at module terminals 116, $V_{IT}$, and the maximum allowable magnitude of voltage supply 106, $V_{IN\_MAX}$. The threshold voltage of isolation device 222, $V_{TH}$, is determined by the value of reference 234, and the maximum input voltage for isolation device 222, $V_{MAX}$, is device dependent. The current limit set by isolation device 222, $I_{IP}$, can be determined by: $I_{IP} = (2.25 \text{ mA} \times 562\Omega)/R_{SENSE}$ $$V_{IT} = V_{TH} + R_{THR} * (I_{IP})$$

$$V_{IN\_MAX} = V_{MAX} + R_{THR} * ((V_{MAX}/R_{SHUNT}) + I_{IP})$$

Still referring to the examples of FIGS. 2a and 2b, the following Table 1a and Table 1b provide example values for resistors 204, 206 and 210 based on the magnitude of voltage source 106. Table 1a provides example values where voltage supply 106 is a DC supply. The first column of Table 1a is the intended magnitude of voltage supply 106 and the second column is the maximum magnitude of voltage supply 106.

TABLE 1a

| VDC System (V) | $V_{IN\_MAX}$ (V) | $R_{THR}$ (kΩ) | $R_{SHUNT}$ (kΩ) | $R_{SENSE}$ (Ω) | Transition Threshold (V) | | | $I_{IN}$ (mA) |
|---|---|---|---|---|---|---|---|---|
| | | | | | Min | Typ | Max | |
| 48 | 77 | 8.5 | — | 560 | 24 | 27 | 30 | 2.3 |
| 110 | 137 | 22 | 40 | 560 | 54 | 62 | 70 | 3.3 |
| 240 | 250 | 38 | 22 | 560 | 100 | 113 | 126 | 4.7 |

Table 1b provides example values where voltage supply 406 is an AC supply (discussed below with reference to FIG. 4). The first column of Table 1b is the intended RMS magnitude of voltage supply 106 and the second column is the maximum RMS magnitude of voltage supply 106 (in RMS).

TABLE 1b

| VAC System ($V_{RMS}$) | $V_{IN\_MAX}$ ($V_{RMS}$) | $R_{THR}$ (kΩ) | $R_{SHUNT}$ (kΩ) | $R_{SENSE}$ (Ω) | Transition Threshold ($V_{RMS}$) | | |
|---|---|---|---|---|---|---|---|
| | | | | | Min | Typ | Max |
| 110 | 148 | 33 | 24 | 560 | 58 | 66 | 73 |
| 240 | 300 | 60 | 15 | 560 | 109 | 124 | 138 |

FIG. 4 is a voltage and current diagram for the example isolation system 200 of FIG. 2a and FIG. 2b where values for $V_{OUT}$ (graph 306), $V_{SENSE}$ (graph 304) and $I_{IN}$ (graph 302) are plotted versus $V_{IN}$. The horizontal axis for FIG. 4 shows values for $V_{IN}$ (magnitude of voltage supply 106). The vertical axis on the left shows values for $V_{SENSE}$ (voltage at input 212) and $V_{OUT}$ (voltage at output 220), and the vertical axis on the right shows values for $I_{IN}$ (input current at $R_{THR}$—shown as $I_1$ in FIG. 2a). Based on graph 306, FIG. 4 shows that that a transition threshold occurs around 110V and the input to isolation device 222 remains under 60V (based on graph 304). Based on graph 302, the input current, $I_{IN}$, remains under 5 mA.

FIG. 4 illustrates another example of an isolation system 400. In this example, voltage source 406 is an AC source. Since the input source is an AC source, bridge rectifier 402 is utilized between $R_{THR}$ 204 and rail 242. The capacitance of capacitor 208 should be properly chosen to limit ripple at input 212. In an example, capacitor 208 is greater than 1 nF. In other examples, capacitor 208 is around 10 nF or 330 nF.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "approximately" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An isolation circuit for electrically isolating a first circuit operating at a first voltage from a second circuit operating at a second voltage that is different than the first voltage, the isolation circuit comprising:
   a first voltage source that operates at the first voltage, the first voltage source having a first supply rail and a second supply rail;
   an isolation device having a first input, a second input, a first output and a second output, the second input directly connected to a first ground potential and the second output coupled to a second ground potential that is electrically isolated from the first ground potential by the isolation device;
   a first resistor coupled between the first supply rail and the first input of the isolation device;
   a second resistor directly connected between the first input of the isolation device and the first ground potential; and
   wherein the first output of the isolation device is coupled to the second circuit.

2. The circuit of claim 1, where the first voltage is an AC voltage.

3. The circuit of claim 2, further comprising a bridge rectifier, the bridge rectifier comprising:
a first diode having an anode and a cathode and connected between the first resistor and the first input of the isolation device, the anode coupled to the first resistor and the cathode coupled to the first input of the isolation device;
a second diode having an anode and a cathode, the cathode of the second diode coupled to the cathode of the first diode and the first input of the isolation device, and the anode of the second diode is coupled to the second supply rail;
a third diode having an anode and a cathode, the cathode of the third diode coupled to the anode of the second diode and the second supply rail, and the anode of the third diode coupled to the second input of the isolation device; and
a fourth diode having an anode and a cathode, the anode of the fourth diode coupled to the anode of the third diode and the second input of the isolation device, and the cathode of the fourth diode coupled to the first resistor and the anode of the first diode.

4. The circuit of claim 1, wherein the first voltage is a DC voltage.

5. The circuit of claim 4, wherein the second supply rail is connected to the first ground potential.

6. The circuit of claim 1, wherein the first voltage is between 48 Volts and 300 Volts.

7. The circuit of claim 1, wherein the second voltage is less than 48 Volts.

8. The circuit of claim 7, wherein the second voltage is less than or equal to 5 Volts.

9. The circuit of claim 7, wherein second voltage is around 1 Volt to 2 Volts.

10. The circuit of claim 1, further comprising a capacitor coupled between the first input of the isolation device and the second input of the isolation device.

11. The circuit of claim 1, wherein the isolation device has a third input.

12. The circuit of claim 11, further comprising a third resistor connected between the first input and the third input of the isolation device.

13. An industrial system having a motor driven by high-voltage circuitry connected to a high-voltage supply and low-voltage circuitry that is connected to a low-voltage supply and electrically isolated from the high-voltage supply, the industrial system comprising:
an isolation device coupled between the high-voltage circuitry and the low-voltage circuitry, the isolation device having a first input, a first ground connection directly connected to a first ground potential, an output coupled to the low-voltage circuitry and a second ground connection coupled to the low-voltage circuitry and electrically isolated from the first ground connection; and
the high-voltage circuitry coupled to a supply rail of the high-voltage supply, the high-voltage circuitry comprising:
a first resistor having a first terminal coupled to the supply rail and a second terminal; and
a second resistor having a first terminal directly connected to the first input of the isolation device and a second terminal directly connected to the first ground potential.

14. The industrial system of claim 13, where the high-voltage supply is an AC voltage supply.

15. The industrial system of claim 14, further comprising a bridge rectifier, the bridge rectifier comprising:
a first diode having an anode and a cathode and connected between the first resistor and the first input of the isolation device, the anode of the first diode coupled to the second terminal of the first resistor and the cathode of the first diode coupled to the first input of the isolation device;
a second diode having an anode and a cathode, the cathode of the second diode coupled to the cathode of the first diode and the first input of the isolation device, and the anode of the second diode is coupled to a ground rail of the high-voltage supply;
a third diode having an anode and a cathode, the cathode of the third diode coupled to the anode of the second diode and the ground rail, and the anode of the third diode is coupled to the first ground connection of the isolation device; and
a fourth diode having an anode and a cathode, the anode of the fourth diode coupled to the anode of the third diode and the first ground connection of the isolation device, and the cathode of the fourth diode coupled to the second terminal of the first resistor and the anode of the first diode.

16. The industrial system of claim 13, wherein the high-voltage supply is a DC voltage supply.

17. The industrial system of claim 16, wherein the first ground connection of the isolation device is connected to a ground rail of the high-voltage supply.

18. The industrial system of claim 13, wherein the high-voltage supply is between 48 Volts and 300 Volts.

19. The industrial system of claim 13, wherein the low-voltage supply is less than or equal to 5 Volts.

20. The industrial system of claim 13, wherein low-voltage supply is around 1 Volt to 2 Volts.

* * * * *